United States Patent
Zhang et al.

(10) Patent No.: US 10,491,927 B1
(45) Date of Patent: Nov. 26, 2019

(54) QUADTREE-BASED BANDWIDTH COMPRESSION PREDICTION METHOD AND SYSTEM THEREOF

(71) Applicant: Xi'an Creation Keji Co., Ltd., Xi'an (CN)

(72) Inventors: Ying Zhang, Xi'an (CN); Yu Luo, Xi'an (CN); Wenfang Ran, Xi'an (CN)

(73) Assignee: XI'AN CREATION KEJI CO., LTD., Xi'an (CN)

( * ) Notice: Subject to any disclaimer, the term of this patent is extended or adjusted under 35 U.S.C. 154(b) by 0 days.

(21) Appl. No.: 16/236,157

(22) Filed: Dec. 28, 2018

(30) Foreign Application Priority Data

Oct. 26, 2018 (CN) .......................... 2018 1 1260610

(51) Int. Cl.
| | | |
|---|---|---|
| *H04N 19/96* | (2014.01) | |
| *H04N 19/119* | (2014.01) | |
| *H04N 19/176* | (2014.01) | |
| *H04N 19/50* | (2014.01) | |
| *H04N 19/192* | (2014.01) | |

(52) U.S. Cl.
CPC .......... *H04N 19/96* (2014.11); *H04N 19/119* (2014.11); *H04N 19/176* (2014.11); *H04N 19/192* (2014.11); *H04N 19/50* (2014.11)

(58) Field of Classification Search
CPC ..... H04N 19/119; H04N 19/96; H04N 19/176
USPC ...................................... 375/240.12
See application file for complete search history.

(56) References Cited

U.S. PATENT DOCUMENTS

2006/0251330 A1* 11/2006 Toth ....................... H04N 19/52
382/236

* cited by examiner

*Primary Examiner* — Jeffery A Williams
(74) *Attorney, Agent, or Firm* — Hemisphere Law, PLLC; Zhigang Ma

(57) ABSTRACT

The present invention relates to a quadtree-based bandwidth compression prediction method and a system thereof. The bandwidth compression prediction method for example includes: dividing a to-be-predicted macroblock; obtaining a first prediction residual and a second prediction residual; judging whether re-dividing is performed on the to-be-predicted macroblock; and outputting the prediction residual and pixel component minimum values of the final sub-macroblocks divided from the to-be-predicted macroblock. According to the quadtree-based bandwidth compression prediction method and system, during the processing of complex texture images, the prediction effect is good, the processing efficiency is high, and the theoretical limit entropy can be reduced.

10 Claims, 3 Drawing Sheets

QUADTREE-BASED BANDWIDTH COMPRESSION PREDICTION METHOD AND SYSTEM THEREOF

BACKGROUND OF THE INVENTION

1. Field of the Invention

The present invention belongs to the field of image compression technologies, and in particular to a quadtree-based bandwidth compression prediction method and a quadtree-bandwidth compression prediction system.

2. Description of Related Art

With the gradual increase of the demand of the people for video quality, the image resolution of videos as one of the important characteristics of the video quality has transitioned from 720p and 1080p to the current mainstream 4K video resolution on the market, and the corresponding video compression standard is also transitioned from H.264 to H.265.

For a video processing chip, the multiplication of the resolution will not only cause a large increase in the chip area cost, but also bring a great impact on the bus bandwidth and power consumption. The basic principle of video coding compression is to use the correlation between space domain, time domain and code words to remove redundancy as much as possible. The current popular practice is to use a block-based hybrid video coding framework to implement video coding compression by the steps such as prediction, transformation, quantization, and entropy coding. As an important module, the prediction reduces the image space redundancy by seeking the correlation of image data, and finally minimizes the theoretical entropy of the image data.

The existing prediction methods mainly use the texture feature analysis-based manner for prediction. For complex texture images, the prediction effect and prediction efficiency are poor, and the theoretical limit entropy cannot be reduced very well.

SUMMARY OF THE INVENTION

The present invention provides a quadtree-based bandwidth compression prediction method and a quadtree-based bandwidth compression prediction system, which can greatly improve the prediction effect and prediction efficiency of complex texture images.

A quadtree-based bandwidth compression prediction method, includes step 1, dividing a to-be-predicted macroblock according to a quadtree algorithm to obtain a first sub-macroblock, a second sub-macroblock, a third sub-macroblock, and a fourth sub-macroblock; step 2: obtaining a first bit number and a first prediction residual according to the to-be-predicted macroblock; step 3: obtaining a second bit number and a second prediction residual according to the first sub-macroblock, the second sub-macroblock, the third sub-macroblock, and the fourth sub-macroblock; step 4: judging, according to the first bit number, the first prediction residual, the second bit number, and the second prediction residual, whether re-dividing is performed on the to-be-predicted macroblock; if yes, then going to the step 1, and taking the first sub-macroblock, the second sub-macroblock, the third sub-macroblock, and the fourth sub-macroblock each as the to-be-predicted macroblock to perform the step 1 through the step 4 according to a recursive algorithm; or if no, ending the dividing of the to-be-predicted macroblock; and step 5: outputting the prediction residual and pixel component minimum values of the first sub-macroblock, the second sub-macroblock, the third sub-macroblock, and the fourth sub-macroblock.

A quadtree-based bandwidth compression prediction system includes a memory and at least one processor coupled to the memory. The at least one processor is configured (i.e., structured and arranged) to perform the quadtree-based bandwidth compression prediction method as described above.

According to the quadtree-based bandwidth compression prediction method and system provided by the embodiments of the present invention, by using the bit numbers and the prediction residuals of the macroblocks as a judgment flag of whether to continuously divide the to-be-predicted macroblock, the final quadtree-based dividing manner for the to-be-predicted macroblock is determined. The compression efficiency and subjective picture quality are improved. During the processing of complex texture images, the prediction effect is good, the processing efficiency is high, and the theoretical limit entropy can be reduced.

DETAILED DESCRIPTION OF PREFERRED EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
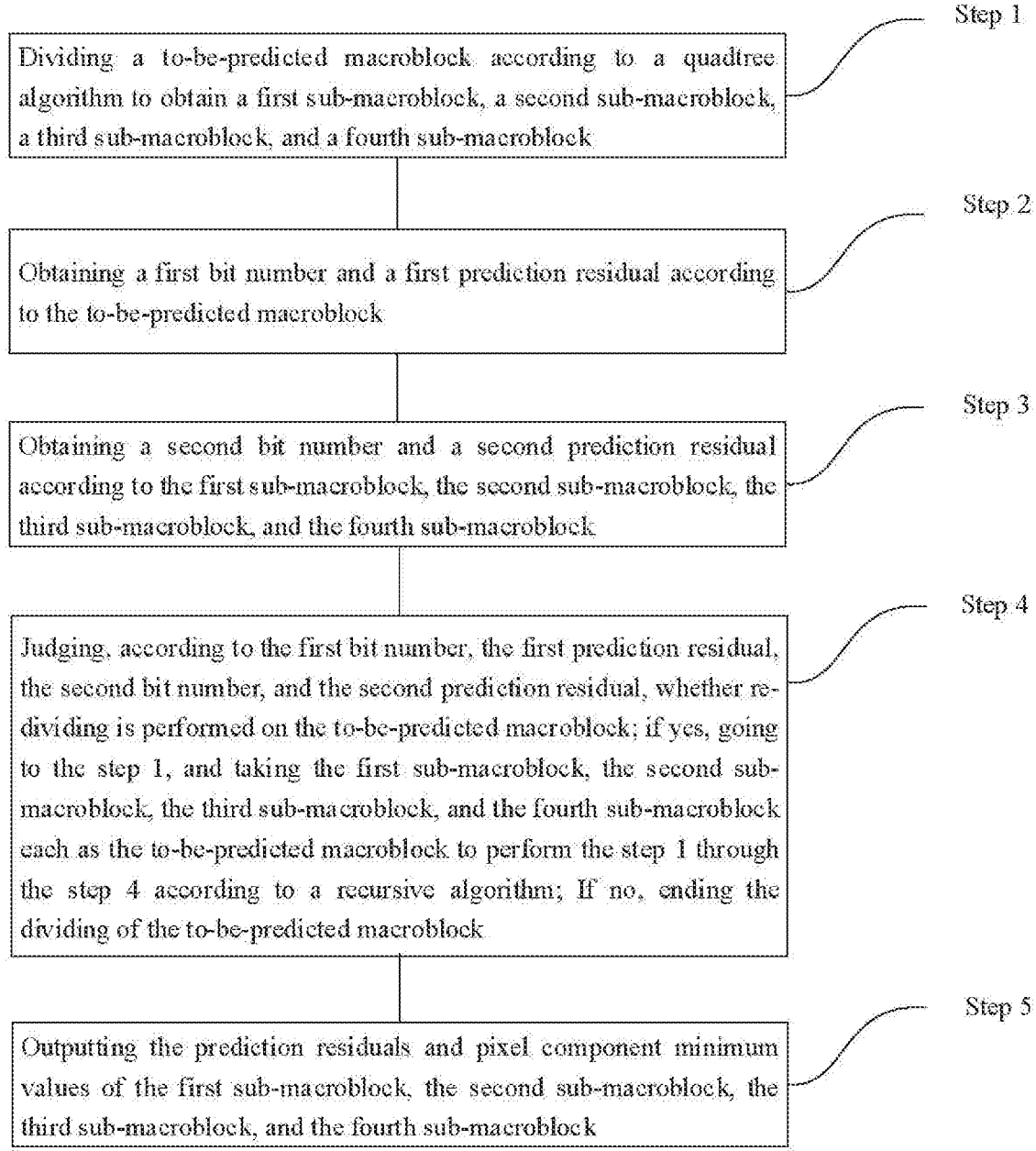
FIG. 1 is a flowchart of a quadtree-based bandwidth compression prediction method according to an embodiment of the present invention.

Referring to FIG. 1, FIG. 1 is a flowchart of a quadtree-based bandwidth compression prediction method according to an embodiment of the present invention. The bandwidth compression prediction method includes the following steps: step 1, dividing a to-be-predicted macroblock according to a quadtree algorithm to obtain a first sub-macroblock, a second sub-macroblock, a third sub-macroblock, and a fourth sub-macroblock; step 2: obtaining a first bit number and a first prediction residual according to the to-be-predicted macroblock; step 3: obtaining a second bit number and a second prediction residual according to the first sub-macroblock, the second sub-macroblock, the third sub-macroblock, and the fourth sub-macroblock; step 4: judging, according to the first bit number, the first prediction residual, the second bit number, and the second prediction residual, whether re-dividing is performed on the to-be-predicted macroblock; if yes, then, going to step 1, and taking the first sub-macroblock, the second sub-macroblock, the third sub-macroblock, and the fourth sub-macroblock each as the to-be-predicted macroblock to perform the step 1 through the step 4 according to a recursive algorithm; If no, ending the dividing of the to-be-predicted macroblock; and step 5: outputting the prediction residual and pixel component minimum values of the first sub-macroblock, the second sub-macroblock, the third sub-macroblock, and the fourth sub-macroblock.

According to the embodiment of the present invention, the quadtree-based bandwidth compression prediction method performs first-layer quadtree dividing on the current to-be-predicted macroblock, and judges whether or not to perform re-dividing according to the bit number and the prediction residual under the original to-be-predicted macroblock, and the bit number and the prediction residual under the divided to-be-predicted macroblocks respectively, to achieve the effect of balancing the compression ratio and the transmitted bit number. During the processing of complex texture images, the prediction effect is good, the processing efficiency is high, and the theoretical limit entropy can be reduced.

[Embodiment 1]

Figure 2:
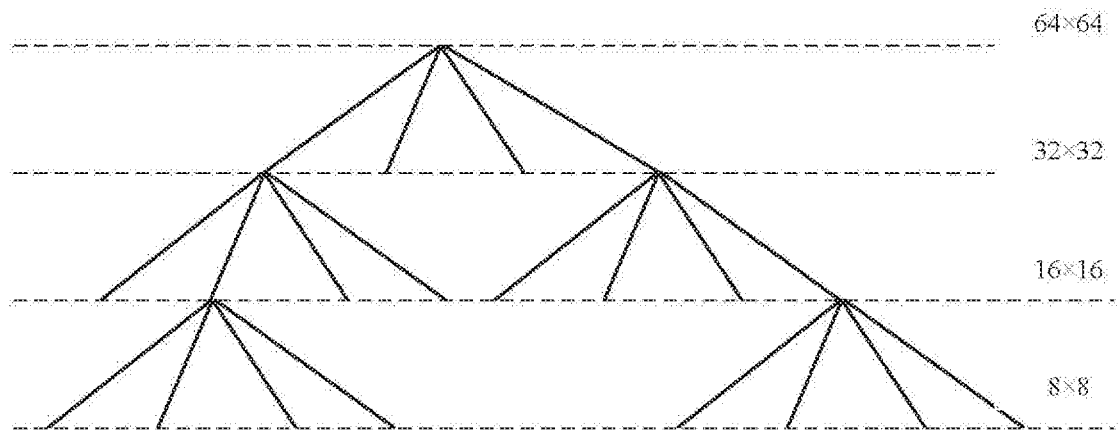
FIG. 2 is a schematic diagram of a quadtree dividing manner for a to-be-predicted macroblock according to an embodiment of the present invention.
Figure 3:
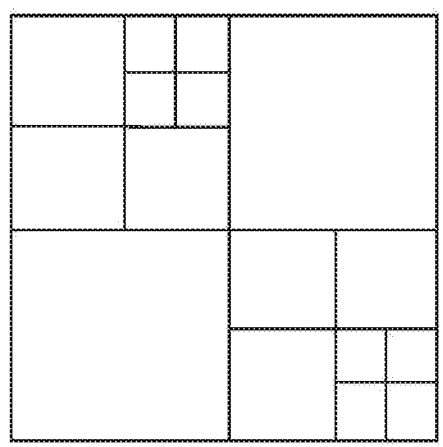
FIG. 3 is a schematic diagram of another quadtree dividing manner for a to-be-predicted macroblock according to an embodiment of the present invention.
Figure 4:
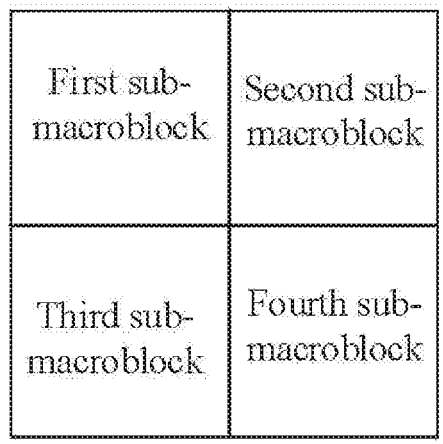
FIG. 4 is a schematic diagram of yet another quadtree dividing manner for a to-be-predicted macroblock according to an embodiment of the present invention.
Figure 5:
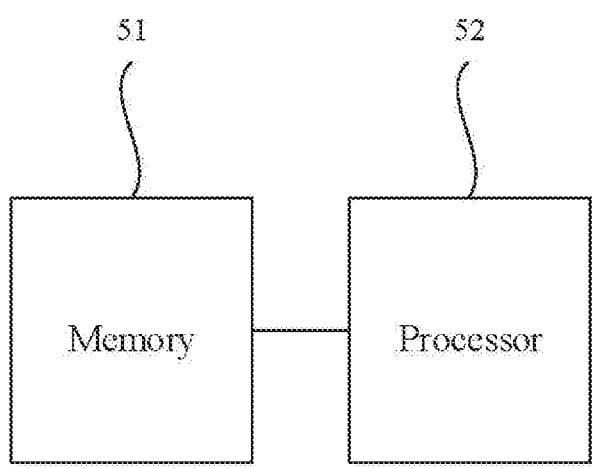
FIG. 5 is a schematic structural diagram of a quadtree-based bandwidth compression prediction system according to an embodiment of the present invention.

Referring to FIG. 2 to FIG. 5, FIG. 2 is a schematic diagram of a quadtree dividing manner for a to-be-predicted macroblock according to an embodiment of the present invention. FIG. 3 is a schematic diagram of another quadtree dividing manner for a to-be-predicted macroblock according to an embodiment of the present invention. FIG. 4 is a schematic diagram of yet another quadtree dividing manner for a to-be-predicted macroblock according to an embodiment of the present invention. FIG. 5 is a schematic structural diagram of a quadtree-based bandwidth compression prediction system according to an embodiment of the present invention. The present embodiment introduces the quadtree-based bandwidth compression prediction method in detail based on the above embodiments.

The video can typically include a series of pictures, and each picture is divided or segmented into a predetermined area, such as frames or macroblocks. When the area of the video is divided into macroblocks, the divided macroblocks may be classified into intraframe macroblocks or interframe macroblocks according to an encoding method. The intraframe macroblocks refer to the macroblocks coded by an intraframe prediction coding method. The intraframe prediction coding method predicts the pixels of a current block by using the pixels of a currently-coded reconstructed block coded and decoded before in a current picture, to generate a predicted macroblock, and then the difference value between the pixels of the predicted macroblock and the pixels of the current macroblock is coded.

In the embodiment of the present invention, the coding object may be a 64×64-sized image macroblock, or a 16×16-sized image macroblock, or an image macroblock having a smaller or larger size. For example, the to-be-predicted macroblock is recursively divided according to a quadtree algorithm, and each macroblock is divided into four sub-macroblocks of the same size. Whether or not each sub-macroblock continues to be divided is judged by a preset algorithm. As shown in FIG. 2, it is assumed that the to be predicted macroblock has a 64×64 size, and the 64×64 macroblock is taken as a root node and is located at the first layer. When it is judged by the preset algorithm that the dividing needs to be continued, the node is divided into four 32×32 sub-macroblocks to form a second layer. When it is judged that the upper right sub-macroblock of the second layer and the lower left sub-macroblock of the second layer need not to be continuously divided, while the upper left sub-macroblock of the second layer and the lower right sub-macroblock of the second layer need to be continuously divided by the preset algorithm, the upper left sub-macroblock of the second layer is divided into four 16×16 sub-macroblocks, and the lower right sub-macroblock of the second layer is divided into four 16×16 sub-macroblocks to form a third layer, which is recursive sequentially until the Nth layer. The final dividing manner of the 64×64-sized predicted macroblock is as shown in FIG. 3.

The specific prediction method is as follows.

Step 1, a to-be-predicted macroblock is divided according to a quadtree algorithm. As shown in FIG. 4, the sub-macroblocks after the to-be-predicted macroblock is divided are a first sub-macroblock, a second sub-macroblock, a third sub-macroblock, and a fourth sub-macroblock respectively.

Step 2: a first bit number and a first prediction residual are obtained according to the original to-be-predicted macroblock. Specifically, a first difference value between a pixel component maximum value in the to-be-predicted macroblock and a pixel component minimum value in the to-be-predicted macroblock is calculated, a first minimum bit number indicating the first difference is obtained, and the first bit number is obtained according to the first minimum bit number and a data bit depth of the to-be-predicted macrobloc, wherein the first bit number satisfies the following formula: MBIT1=M*BIT_MIN1+2*BITDETH, wherein MBIT1 is the first bit number, BIT_MIN1 is the first minimum bit number, BITDEPTH is the data bit depth of the to-be-predicted macroblock, and M is the number of pixel components in the to-be-predicted macroblock.

From all pixel component values in the to-be-predicted macroblock, a minimum value of all pixel component values in the to-be-predicted macroblock is subtracted individually, to obtain the first prediction residual corresponding to all pixel components in the to-be-predicted macroblock.

Step 3: a second bit number and a second prediction residual are obtained according to each sub-macroblock after dividing. Specifically, a second difference value between a pixel component maximum value in the first sub-macroblock and a pixel component minimum value in the first sub-macroblock is calculated to obtain a second minimum bit number representing the first sub-macroblock. A third difference value between a pixel component maximum value in the second sub-macroblock and a pixel component minimum value in the second sub-macroblock is calculated to obtain a third minimum bit number representing the second sub-macroblock. A fourth difference value between a pixel component maximum value in the third sub-macroblock and a pixel component minimum value in the third sub-macroblock is calculated to obtain a fourth minimum bit number representing the third sub-macroblock. A fifth difference value between a pixel component maximum value in the fourth sub-macroblock and a pixel component minimum value in the fourth sub-macroblock is calculated to obtain a fifth minimum bit number representing the fourth sub-macroblock. The second bit number is calculated according to the second minimum bit number, the third minimum bit number, the fourth minimum bit number, the fifth minimum bit number, and the data bit depth of the to-be-predicted macroblock. The second bit number satisfies the following formula: MBIT2=N1*BIT_MIN2+N2*BIT_MIN3+N3*BIT_MIN4+N4*BIT_MIN5+2*BITDETH, wherein MBIT2 is the second bit number, BIT_MIN2 is the second minimum bit number, BIT_MIN3 is the third minimum bit number, BIT_MIN4 is the fourth minimum bit number, BIT_MIN5 is the fifth minimum bit number, BITDEPTH is the data bit depth of the to-be-predicted macroblock, N1 is the number of pixel components in the first sub-macroblock, N2 is the number of pixel components in the second sub-macroblock, N3 is the number of pixel components in the third sub-macroblock, and N4 is the number of pixel components in the fourth sub-macroblock.

From all pixel component values in the first sub-macroblock, a minimum value of all pixel component values in the first sub-macroblock is subtracted individually. From all pixel component values in the second sub-macroblock, a minimum value of all pixel component values in the second sub-macroblock is subtracted individually. From all pixel component values in the third sub-macroblock, a minimum value of all pixel component values in the third sub-macroblock is subtracted individually. From all pixel component values in the fourth sub-macroblock, a minimum value of all pixel component values in the fourth sub-macroblock is subtracted individually, so as to obtain the second prediction residual corresponding to all pixel components in the divided to-be-predicted macroblock.

Step 4: according to the first bit number, the first prediction residual, the second bit number, and the second prediction residual, whether re-dividing is performed on the to-be-predicted macroblock is judged. If yes, the operation skips to step 1, and steps 1 to 4 are respectively performed on the first sub-macroblock, the second sub-macroblock, the third sub-macroblock, and the fourth sub-macroblock as the to-be-predicted macroblock according to a recursive algorithm. If not, the dividing of the to-be-predicted macroblock is ended.

Specifically, according to the first prediction residual, a first reconstructed value of the to-be-predicted macroblock is obtained, and an absolute value of the difference between the first reconstructed value and the pixel value of the to-be-predicted macroblock is solved to obtain a first reconstructed difference value. The first reconstructed difference value and the first bit number are weighted to obtain a first weighting value of the to-be-predicted macroblock, wherein the first weighting value satisfies the following formula: $RDO1=a*MBIT1+b*RES1$, wherein RDO1 is the first weighting value, MBIT1 is the first bit number, RES1 is the first reconstructed difference value, and a and b are weighting coefficients.

The values of a and b may be preset fixed values. Further, $a+b=1$, preferably, a may be selected as 0.5, b may be selected as 0.5, and a and b may be flexibly adjusted.

The reconstructed pixel component refers to a pixel component obtained by decompressing and reconstructing the compressed image, and the pixel value of the reconstructed pixel component is generally called a reconstructed value. Further, the reconstructed value can be obtained according to the prediction residual, that is, the reconstructed value can be obtained by adding the reference value (the pixel component minimum value of each macroblock) with the prediction residual.

According to the second prediction residual, a second reconstructed value of the divided to-be-predicted macroblock is obtained, an absolute value of the difference between the second reconstructed value and the pixel value of the divided to-be-predicted macroblock is solved to obtain a second reconstructed difference value. The second reconstructed difference value and the second bit number are weighted to obtain a second weighting value of the divided to-be-predicted macroblock, wherein the second weighting value satisfies the following formula: $RDO2=a*MBIT2+b*RES2$, wherein RDO2 is the second weighting value, MBIT2 is the second bit number, RES2 is the second reconstructed difference value, and a and b are weighting coefficients.

The values of a and b may be preset fixed values. Further, $a+b=1$, preferably, a may be selected as 0.5, b may be selected as 0.5, and a and b may be flexibly adjusted.

The first weighting value and the second weighting value are compared, if the first weighting value is greater than the second weighting value, the re-dividing is performed on the to-be-predicted macroblock according to the quadtree algorithm, the to-be-predicted macroblock is divided according to the quadtree algorithm, each sub-macroblock is subjected to steps 1 to 4 respectively to judge whether to continue the dividing, i.e., whether the third dividing, fourth dividing till Nth dividing are performed is judged according to the recursive algorithm. Otherwise, if the first weighting value is less than the second weighting value, no re-dividing is performed on the to-be-predicted macroblock.

Step 5: the prediction residual and the pixel component minimum value of each sub-macroblock are output under the final dividing layer of the to-be-predicted macroblock.

Further, the various implementation steps above may be implemented by executing instructions stored in one or more memories through one or more processors.

The present embodiment further provides a quadtree-based bandwidth compression prediction system, as shown in FIG. 5, including: a memory 51 and at least one processor 52 coupled to the memory. The at least one processor 52 is configured to perform the quadtree-based bandwidth compression prediction method according to any one of the above embodiments.

The quadtree-based bandwidth compression prediction method and system provided by the present embodiment predict the correlation between pixel values in the current area, and use the algorithm of the present invention to judge whether the quadtree partitioning is performed on the to-be-predicted macroblock. Therefore, the difference between the initial macroblock and the divided macroblocks is minimized to improve the compression efficiency and improve the subjective picture quality. During the processing of complex texture images, the prediction effect is good, the processing efficiency is high, and the theoretical limit entropy can be reduced.

Industrial Applicability

According to the embodiments of the present invention, by using the bit numbers and the prediction residuals of the macroblocks as a judgment flag of whether to continuously divide the to-be-predicted macroblock, the final quadtree-based dividing manner for the to-be-predicted macroblock is determined. The compression efficiency and subjective picture quality are improved. During the processing of complex texture images, the prediction effect is good, the processing efficiency is high, and the theoretical limit entropy can be reduced.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A quadtree-based bandwidth compression prediction method, comprising:

step 1, dividing a to-be-predicted macroblock according to a quadtree algorithm to obtain a first sub-macroblock, a second sub-macroblock, a third sub-macroblock, and a fourth sub-macroblock;

step 2: obtaining a first bit number and a first prediction residual according to the to-be-predicted macroblock;

step 3: obtaining a second bit number and a second prediction residual according to the first sub-macroblock, the second sub-macroblock, the third sub-macroblock, and the fourth sub-macroblock;

step 4: judging, according to the first bit number, the first prediction residual, the second bit number, and the second prediction residual, whether re-dividing is performed on the to-be-predicted macroblock;

if yes, going to the step 1, and taking the first sub-macroblock, the second sub-macroblock, the third sub-macroblock, and the fourth sub-macroblock each as the to-be-predicted macroblock to perform the step 1 through the step 4 according to a recursive algorithm; or If no, ending the dividing of the to-be-predicted macroblock; and step 5: outputting the prediction residual and pixel component minimum values of the first sub-macroblock, the second sub-macroblock, the third sub-macroblock, and the fourth sub-macroblock.

2. The quadtree-based bandwidth compression prediction method according to claim 1, wherein obtaining a first bit number according to the to-be-predicted macroblock in the step 2 comprises:

calculating a first difference value between a pixel component maximum value in the to-be-predicted macroblock and a pixel component minimum value in the to-be-predicted macroblock, and obtaining a first minimum bit number indicating the first difference value; and obtaining the first bit number according to the first minimum bit number and a data bit depth of the to-be-predicted macroblock.

3. The quadtree-based bandwidth compression prediction method according to claim 2, wherein the first bit number satisfies:

$$MBIT1=M*BIT\_MIN1+2*BITDETH$$

wherein, MBIT1 is the first bit number, BIT_MIN1 is the first minimum bit number, BITDEPTH is the data bit depth of the to-be-predicted macroblock, and M is a number of pixel components in the to-be-predicted macroblock.

4. The quadtree-based bandwidth compression prediction method according to claim 3, wherein obtaining a first prediction residual according to the to-be-predicted macroblock the step 2 comprises:

subtracting, from all pixel component values in the to-be-predicted macroblock, a minimum value of all the pixel component values in the to-be-predicted macroblock individually, to obtain the first prediction residual corresponding to all the pixel components in the to-be-predicted macroblock.

5. The quadtree-based bandwidth compression prediction method according to claim 3, wherein obtaining a second bit number according to the first sub-macroblock, the second sub-macroblock, the third sub-macroblock, and the fourth sub-macroblock comprises:

obtaining a second minimum bit number representing the first sub-macroblock according to the first sub-macroblock;

obtaining a third minimum bit number representing the second sub-macroblock according to the second sub-macroblock;

obtaining a fourth minimum bit number representing the third sub-macroblock according to the third sub-macroblock;

obtaining a fifth minimum bit number representing the fourth sub-macroblock according to the fourth sub-macroblock; and obtaining the second bit number according to the second minimum bit number, the third minimum bit number, the fourth minimum bit number, the fifth minimum bit number, and the data bit depth of the to-be-predicted macroblock.

6. The quadtree-based bandwidth compression prediction method according to claim 5, wherein the second bit number satisfies:

$$MBIT2=N1*BIT\_MIN2+N2*BIT\_MIN3+N3*BIT\_MIN4+N4*BIT\_MIN5+2*BITDETH,$$

wherein, MBIT2 is the second bit number, BIT_MIN2 is the second minimum bit number, BIT_MIN3 the third minimum bit number, BIT_MIN4 is the fourth minimum bit number, BIT_MIN5 is the fifth minimum bit number, BITDEPTH is the data bit depth of the to-be-predicted macroblock, N1 is a number of pixel components in the first sub-macroblock, N2 is a number of pixel components in the second sub-macroblock, N3 is a number of pixel components in the block, and N4 is a number of pixel components in the fourth sub-macroblock.

7. The quadtree-based bandwidth compression prediction method according to claim 5, wherein obtaining a second prediction residual according to the first sub-macroblock, the second sub-macroblock, the third sub-macroblock, and the fourth sub-macroblock in the step 3 comprises:

subtracting from all pixel component values in the first sub-macroblock, a minimum value of all the pixel component values in the first sub-macroblock individually, subtracting, from all pixel component values in the second sub-macroblock, a minimum value of all the pixel component values in the second sub-macroblock individually, subtracting, from all pixel component values in the third sub-macroblock, a minimum value of all the pixel component values in the third sub-macroblock individually, and subtracting, from all pixel component values in the fourth sub-macroblock, a minimum value of all the pixel component values in the fourth sub-macroblock individually, so as to obtain the second prediction residual corresponding to all pixel components in the divided to-be-predicted macroblock.

8. The quadtree-based bandwidth compression prediction method according to claim 1, wherein judging, according to the first bit number, the first prediction residual, the second bit number, and the second prediction residual, whether re-dividing is performed on the to-be-predicted macroblock in the step 4 comprises:

obtaining a first weighting value according to the first bit number and the first prediction residual;

obtaining a second weighting value according to the second bit number and the second prediction residual; and judging, according to the first weighting value and the second weighting value, whether to perform the re-dividing on the to-be-predicted macroblock.

9. The quadtree-based bandwidth compression prediction method according to claim 8, wherein judging, according to the first weighting value and the second weighting value, whether the re-dividing is performed on the to-be-predicted macroblock, comprises:
   comparing the first weighting value with the second weighting value, if the first weighting value is greater than the second weighting value, performing the re-dividing on the to-be-predicted macroblock according to the quadtree algorithm, and if not, performing no re-dividing.

10. A quadtree-based bandwidth compression prediction system, comprising: a memory and at least one processor coupled to the memory, wherein the at least one processor is configured to perform the quadtree-based bandwidth compression prediction method according to claim 1.

* * * * *